Oct. 25, 1955  YAO T. LI ET AL  2,721,919
ELECTRIC TRANSDUCER
Filed April 14, 1954

INVENTORS
YAO TZU LI
SHIH-YING LEE

BY Kenway Jenney
Witter & Hildreth

ATTORNEYS

United States Patent Office 2,721,919
Patented Oct. 25, 1955

2,721,919

ELECTRIC TRANSDUCER

Yao T. Li, Watertown, and Shih-ying Lee, Arlington, Mass.

Application April 14, 1954, Serial No. 423,143

3 Claims. (Cl. 201—63)

The present invention relates to a force transducer of the strain gage type and more particularly to a structure for the measurement of rectilinear motions by resistance changes. The invention makes use of the unbonded type of strain gage in which the strain sensitive wires are supported only at intervals.

An object of the present invention is to provide a simple, accurate and readily constructed strain gage for accurately measuring small rectilinear movements and hence capable of measuring force, acceleration, pressure, or the like.

Another object of the invention is to diminish the inertia of the strain gage whereby operations at high frequencies may be readily carried out.

With these objects and others in view as will hereinafter appear the invention comprises the transducer hereinafter described and particularly defined in the claims.

In the accompanying drawings illustrating the preferred form of the invention,

Figure 1:
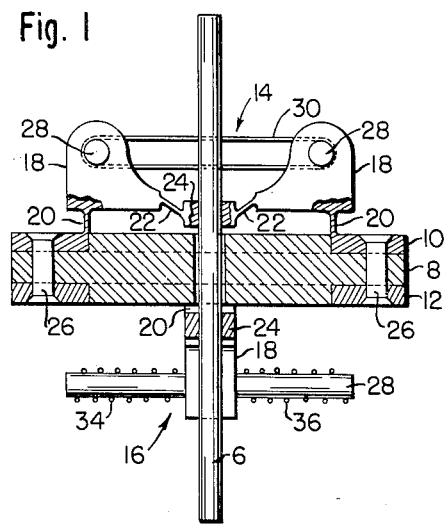
Fig. 1 is an elevation of the transducer.

The apparatus shown in Fig. 1 comprises a central armature rod or spindle 6, the motion of which is to be measured. As will be shown later, the motion of the armature may be brought about by variations in force or pressure through a connection to a diaphragm or other suitable operating member. The armature rod passes freely through a central opening in a disk or plate 8.

The disk 8 is channeled on opposite faces near its periphery to receive ring members 10 and 12, each of which is a part of a strain gage assembly. One of these strain gage assemblies, indicated as the upper assembly, is shown generally at 14, while the other, designated the lower assembly, is shown generally at 16. The two assemblies are substantially identical.

Referring now to the upper assembly 14, this comprises a pair of diametrically opposed members 18 which may be termed rocker plates each being connected by a leg 20 with the ring 10. The leg 20 is of metal and is flexible to allow a limited amount of rocking of the member 18 on the ring 10. The inner end of each rocker plate is provided with a leg 22 connected to a small ring 24 which in turn is suitably secured to the armature rod.

Preferably the entire assembly 14 thus far described, including the ring 10, the plates 18, the legs 20 and 22 and the ring 24, is milled or otherwise machined out of a single block of metal. The machining operation is readily accomplished and is preferred to a built-up manufacture because of the greater certainty and accuracy of the operation of the device.

The strain gage assembly unit 16 is identical with the unit 14. Preferably as shown in Fig. 1, it is mounted so that the plane of the rocker plates is perpendicular to the plane of the plates of the unit 14.

It will be noted that the rings 24 are slightly larger than the hole in the plate 8 and hence they form stops to limit the motion of the armature 6.

The rings 10 and 12 are secured to the disk 8, preferably by rivets 26 as shown. The stop rings 24 are suitably secured to the armature rod 6 by soldering or welding, or by a force fit.

Figure 2:
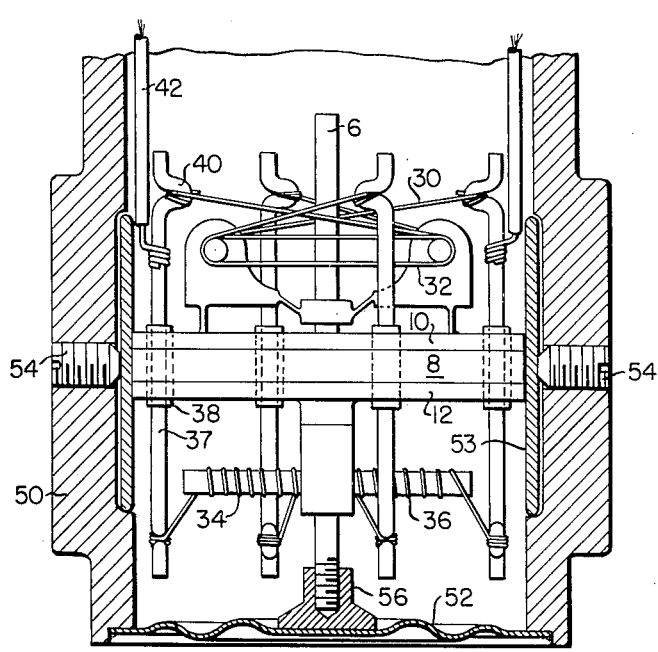
Fig. 2 is an elevation, partly in section, showing the preferred manner of anchoring the windings.

As shown in Figs. 1 and 2 each rocker plate 18 is provided with an insulating pin 28 extending therethrough and serving as a support for the strain gage winding. Preferably there are four windings indicated at 30, 32, 34 and 36, the first two being on the upper unit 14 and the other two on the lower unit 16. As clearly shown in Fig. 1, each leg 22 preferably extends in a direction to pass through the center of the pin 28.

It is necessary to provide two terminals for each of the strain windings. To this end the mounting plate 8 is provided with a number of terminal posts 37. Each is mounted in an insulating support 38 and is provided at its ends with clip portions 40 capable of frictionally engaging and firmly holding the strain wire. It will be understood that the strain wire is usually not greater than 1 mil in diameter and must be firmly anchored without danger of breakage. One end of each of the strain gage windings is secured in a clip 40 and is wound around the pins 28 of opposed rocker plates, and the other end of the wire is secured in another one of the clips. Suitable electrical terminal wires 42 are connected with the terminal posts.

Figure 4:
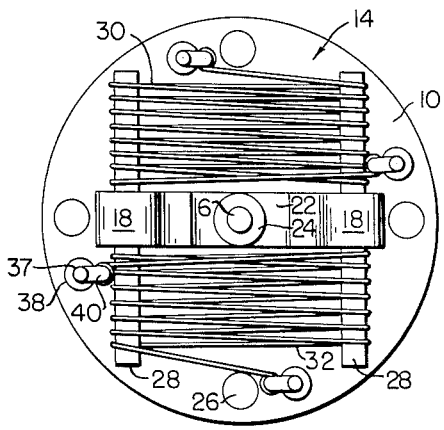
Fig. 4 is a plan view of the transducer.
Figure 3:
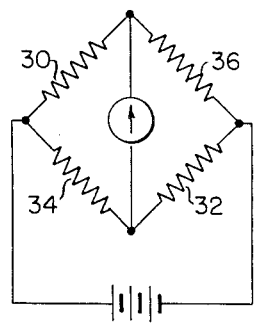
Fig. 3 is a diagram of a bridge circuit embodying the transducer of the present invention.

The four windings are preferably arranged in a bridge as indicated in Fig. 3. The two windings 30 and 32 at one side of the unit are included in two diagonal arms, and the other windings are included in the other two diagonal arms. The electrical connections to the bridge are in accordance with usual practice, as indicated in Fig. 3. By the relative arrangement of the parts as shown in Figs. 2 and 4, the junctions at the four corners of the bridge are formed by the four posts 37. It will be understood that each winding is under an initial tension which is maintained by the clips 40.

The parts may be conveniently assembled in the following manner: The rod 6 carrying one of the rings with its assembly (say the upper ring 10 with the rockers 18, etc.) is positioned with respect to the plate 8. The rod and the ring 24 are secured, as heretofore noted, preferably by a force fit. The rod 6 is drawn down against the resiliency of the legs 20, and the ring 24 is clamped against the upper surface of the plate 8. The lower assembly including the ring 12 is then forced on the rod and brought into position, with the lower center ring 24 spaced from the bottom surface of the plate 8 by a specified distance, usually of the order of one or two thousandths of an inch. The outer rings are then secured, as shown at 26. The clamp is then released, whereupon the rod takes a position such that the upper and lower rings 24 are equidistant from the surface of the plate 8. The windings may be wound on the pins 28 either before or after the release of the clamp.

In operation, a motion of the rod results in differential strains on the two pairs of windings on opposite sides of the plate 8. Thus, upon an upward motion of the rod 6 as viewed in Fig. 1, the rocker plates 18 of the upper assembly are swung slightly outwardly about the legs 20 as pivots, thereby increasing the tension on the strain windings 30 and 32 while the plates 18 of the lower assembly 16 are swung inwardly, thereby decreasing the tension in the strain windings 34 and 36. The bridge is unbalanced and the unbalance current is a measure of the motion. It will be observed that the apparatus is direction-sensitive since the electrical measuring apparatus is sensitive to the direction of unbalance.

The apparatus has inherent temperature compensation, since if the armature expands or contracts, it rocks all four of the rocker plates 18 equally, thereby maintaining the bridge in balance.

Fig. 2 shows an apparatus for measuring pressure. A casing 50 is closed by a diaphragm 52 which is exposed on the lower side to the source of pressure to be measured. The apparatus thus far described is received within a sleeve 53, mounted within the casing and is held in place in the casing by any suitable means indicated as set screws 54. Attached to the armature rod 6 is a foot 56 which is welded on the center of the diaphragm. The diaphragm and the transducer of the present invention are capable of responding to variations of pressure at high frequencies because of the small mass of the moving parts.

For purposes of description the apparatus has been shown on an enlarged scale. While there is no limit as to size of the equipment, the transducer may be of small and compact construction, in which the plate 8 is about ½ inch in diameter or even less. Because of the sensitivity of the strain gage, the apparatus is sensitive to extremely small motions of the armature.

Having thus described the invention, we claim:

1. A strain gage transducer comprising a central spindle, a supporting plate through which the spindle passes, two pairs of rockers mounted for slight pivotal motion on the plate and connected to the spindle, one pair of rockers being disposed on each side of the plate, and strain gage windings carried by the two pairs of rockers and adapted to be differentially strained upon motion of the spindle.

2. A strain gage transducer comprising a central spindle, a supporting plate through which the spindle passes, two pairs of rockers mounted for slight pivotal motion on the plate and connected to the spindle, one pair of rockers being disposed on each side of the plate, an insulating pin carried by each rocker, and strain gage windings wound on opposed pins, the windings on opposite sides of the plate being subjected to differential strains on motion of the spindle.

3. A strain gage transducer comprising a central spindle, a supporting plate through which the spindle passes, two strain gage assemblies, one on each side of the plate, each assembly comprising a unitary member having an outer ring and a pair of rockers thereon, each rocker being capable of limited pivotal movement on the ring, each assembly having its outer ring secured to the supporting plate and the inner portions of each rocker connected with the spindle, and strain gage windings carried by the two pairs of rockers to be differentially strained upon motion of the spindle.

References Cited in the file of this patent

UNITED STATES PATENTS

| 2,523,464 | Golden et al. | Sept. 26, 1950 |
| 2,636,964 | Lancor et al. | Apr. 28, 1953 |